Patented Aug. 15, 1944

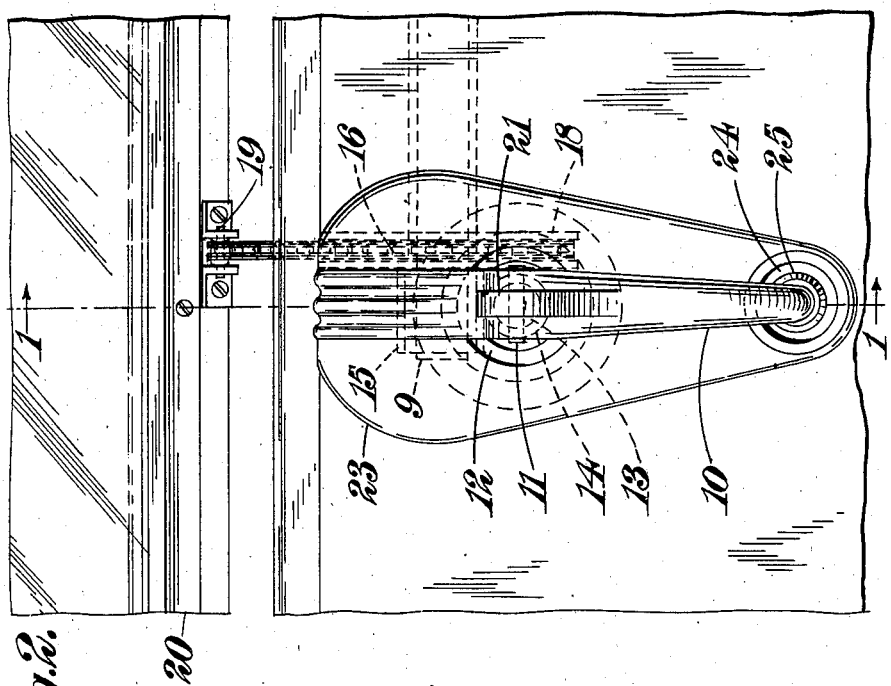
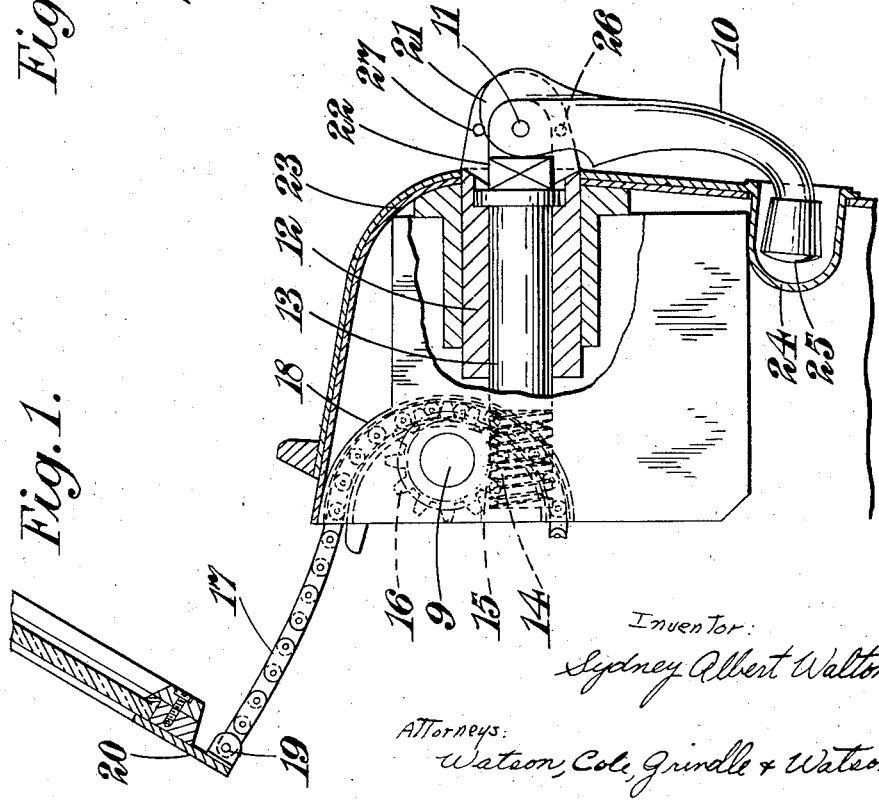

2,355,932

UNITED STATES PATENT OFFICE 2,355,932

VEHICLE WINDSCREEN OR WINDOW OPENING AND CLOSING MECHANISM

Sydney Albert Walton, Cricklewood, London, England, assignor to S. Smith & Sons (Motor Accessories) Limited, Cricklewood, London, England, a British company Application April 17, 1943, Serial No. 483,510
In Great Britain February 6, 1942

6 Claims. (Cl. 268—102)

This invention relates to a vehicle windscreen or window opening and closing mechanism of the kind in which a rotatable handle is connected to a part of a transmission arranged to impart the required movement to the windscreen or window. These handles are usually in the form of a crank and at all times project from their surroundings and thus are inclined to be unsightly. An object of the present invention is to provide a handle which may be moved into a retracted inoperative position where it is less unsightly.

According to this invention a vehicle windscreen or window opening and closing mechanism of the kind referred to is characterised in that the rotatable handle is pivotally mounted on a part through which rotation may be transmitted to the mechanism so that it may be swung through approximately 180° into a retracted position about an axis transversely arranged, preferably at right-angles, to the axis of rotation. Thus, in the case where a crank-handle is employed, it may be swung to a position in which the hand-grip of the handle is less exposed to view since it no longer projects outwardly.

Preferably, means are provided for automatically disconnecting the handle or the part on which it is pivotally mounted from the aforesaid transmission as it is swung towards its retracted position. This enables the handle to be rotated about the first said axis without operating the transmission mechanism, and enables the handle to be brought into any desired position, for example, opposite an opening in the facia board or window frame, in which the hand-grip may be accommodated.

The following is a description of the operating mechanism for a pivoted windscreen of an automobile, reference being made to the accompanying drawing, in which:

Figure 1 is a section through a part of the facia board on which the manipulating handle is mounted, and Figure 2 is a front elevation of the arrangement shown in Figure 1.

A cranked manipulating handle 10 is pivoted at 11 to the end of a rotatable sleeve 12 which encircles a shaft 13. The shaft 13 is provided in known manner with worm teeth 14 at its extremity which engage a worm wheel 15 mounted on a cross-shaft 9. The cross-shaft is also provided with a sprocket wheel 16 which engages a chain 17 passing through a semi-circular sheath 18. The chain is of the known kind which remains rigid when extruded from the sheath and is secured at 19 to the end of the window-frame 20.

A projecting lug 21 on the handle to one side of the pivot 11, is arranged to engage a slot 22 in the shaft when the handle is swung into an operative position, whereby the sleeve is keyed to the shaft and rotates with it. The shaft and the sleeve are mounted so that the end of the shaft is almost flush with the surrounding facia board 23. An inset pocket 24 is formed in the facia board below the shaft and is arranged to accommodate the end 25 of the handle when it is swung downwardly into an inoperative position. When so located, the shank 10 of the handle projects sufficiently in front of the facia board to enable it to be gripped in order to bring it into an operative position. A spring detent such as a spring pressed ball 26 may be mounted in a suitable socket in the handle, near the pivot point, so as to be engaged by one of two recesses 27 in the faces of the slot in the sleeve. The handle is moved to the inoperative position by rotating it about its pivot; this withdraws the lug from the slot so as to disconnect the handle from the shaft, thereby enabling the sleeve to be rotated independently of the shaft to bring the hand-grip of the handle into the correct position for entering the pocket in the facia board. Alternatively, the handle may be designed so that when it is in the inoperative position, it is substantially flush with the facia board so as not to break the continuity thereof and so give to it a smooth and pleasing appearance, in which case the lug on the handle also serves as a projection for enabling the hand-grip to be withdrawn from the opening when required.

It will be appreciated that the same form of handle mounting could be employed for operating the windows of a vehicle.

I claim:

1. A vehicle window opening and closing mechanism comprising a rotatable cranked handle, a transmission between the handle and the window, a sleeve rotatably mounted on a part of said transmission, the cranked handle being pivotally mounted in said sleeve, a facia board, a bearing associated with the facia board for accommodating said sleeve, a projection on said handle arranged to engage a slot in said part of the transmission when the handle is swung from an inoperative to an operative position, a depression in the facia board for accommodating the end of the handle when swung into an inoperative position.

2. A vehicle window opening and closing mechanism comprising a rotatable cranked handle, a transmission between the handle and the window, a sleeve rotatably mounted on a part of said transmission, the cranked handle being pivotally mounted in said sleeve, a bearing carried by a part of said vehicle adjacent said window for accommodating said sleeve, a projection rigid with said handle arranged to engage a slot in said part of the transmission when the handle is swung from an inoperative to an operative position, a depression in said vehicle part for accommodating the end of the handle when swung into an inoperative position.

3. A vehicle window opening and closing mechanism comprising a rotatable cranked handle, a transmission between the handle and the window, a sleeve rotatably mounted on a part of said transmission, the cranked handle being pivotally mounted in said sleeve, a bearing carried by a part of said vehicle adjacent said window for accommodating said sleeve, a projection rigid with said handle arranged to engage a slot in said part of the transmission when the handle is swung from an inoperative to an operative position.

4. A vehicle window opening and closing mechanism comprising a rotatable handle, a transmission between the handle and the window, said transmission including a rotatable stub shaft coaxial with the axis of rotation of said handle, a sleeve freely rotatable on said stub shaft, a pivotal connection between said handle and said sleeve, a slot in the end of said shaft which projects through said sleeve, a projection on said handle adjacent said pivotal connection adapted to be brought into and out of engagement with said slot by the swinging movement of the handle about an axis transverse to the axis of rotation.

5. A vehicle window opening and closing mechanism comprising a rotatable handle, a transmission between the handle and the window, said transmission including a rotatable stub shaft coaxial with the axis of rotation of said handle, a sleeve freely rotatable on said stub shaft, a bearing carried by a part of said vehicle adjacent said window for accommodating said sleeve, a pivotal connection between said handle and said sleeve, a slot in the end of said shaft which projects through said sleeve, a projection on said handle adjacent said pivotal connection adapted to be brought into and out of engagement with said slot by the swinging movement of the handle about an axis transverse to the axis of rotation and intersecting the axis of rotation of said handle.

6. A vehicle window opening and closing mechanism comprising a rotatable handle, a transmission between the handle and the window, said transmission including a rotatable stub shaft coaxial with the axis of rotation of said handle, a sleeve freely rotatable on said stub shaft, spaced ears extending from one end of said sleeve and embracing a portion of said handle, a pivot pin extending through registering openings in said ears and said handle, a slot in that end of said shaft which projects through said sleeve, a projection on said handle adjacent said pivotal connection adapted to be brought into and out of engagement with said slot by the swinging movement of the handle about an axis transverse to the axis of rotation, and resilient detent means on said handle and said ears for releasably retaining the handle in its engaged and disengaged positions.

SYDNEY ALBERT WALTON.